United States Patent
Liu et al.

(10) Patent No.: US 11,796,348 B2
(45) Date of Patent: Oct. 24, 2023

(54) OPTICAL DRIVING MECHANISM

(71) Applicant: TDK TAIWAN CORP., Taoyuan (TW)

(72) Inventors: Shou-Jen Liu, Taoyuan (TW);
Chao-Chun Chang, Taoyuan (TW);
Sin-Hong Lin, Taoyuan (TW);
Wei-Cheng Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 336 days.

(21) Appl. No.: 16/408,871

(22) Filed: May 10, 2019

(65) Prior Publication Data
US 2019/0346284 A1 Nov. 14, 2019

Related U.S. Application Data

(60) Provisional application No. 62/670,580, filed on May 11, 2018.

(30) Foreign Application Priority Data

May 6, 2019 (CN) .......................... 201910371090.8

(51) Int. Cl.
*G02B 7/09* (2021.01)
*G01D 5/14* (2006.01)
(Continued)

(52) U.S. Cl.
CPC .............. *G01D 5/145* (2013.01); *G02B 7/09* (2013.01); *G02B 27/646* (2013.01); *G03B 5/00* (2013.01);
(Continued)

(58) Field of Classification Search
CPC . G02B 7/00; G02B 7/02; G02B 7/026; G02B 7/09; G02B 7/105; G02B 5/00
See application file for complete search history.

(56) References Cited

U.S. PATENT DOCUMENTS

2015/0309282 A1* 10/2015 Lee ........................ G03B 3/10
 359/814
2016/0048033 A1* 2/2016 Kim .................... G02B 27/646
 348/357
(Continued)

FOREIGN PATENT DOCUMENTS

CN 106461908 A 2/2017
CN 107688245 A 2/2018

OTHER PUBLICATIONS

Office Action dated Nov. 16, 2021 in CN Application No. 201910371090.8, 7 pages.

*Primary Examiner* — Christopher Stanford
*Assistant Examiner* — Journey F Sumlar
(74) *Attorney, Agent, or Firm* — Muncy, Geissler, Olds & Lowe, P.C.

(57) ABSTRACT

An optical driving mechanism is provided, for driving an optical element, including: a fixed portion, a movable portion, a driving assembly and a position sensing assembly. The movable portion is movably connected to the fixed portion and includes a holder for sustaining the optical element. The driving assembly is configured to drive the movable portion to move relative to the fixed portion. The position sensing assembly is configured to sense a distance of the movable portion relative to the fixed portion, the position sensing assembly includes a sensing magnetic element and a sensor, wherein the sensing magnetic element is disposed on the movable portion and has a rectangular structure. A direction of a long axis of the rectangular structure extends in a direction that is perpendicular to the optical axis of the optical element, and the direction of the long axis is different from the optical axis direction.

18 Claims, 10 Drawing Sheets

(51) Int. Cl.
*G02B 27/64* (2006.01)
*G03B 5/00* (2021.01)
*G03B 13/36* (2021.01)

(52) U.S. Cl.
CPC ...... *G03B 13/36* (2013.01); *G03B 2205/0007* (2013.01); *G03B 2205/0046* (2013.01); *G03B 2205/0069* (2013.01)

(56) References Cited

U.S. PATENT DOCUMENTS

| | | | |
|---|---|---|---|
| 2016/0077305 A1* | 3/2016 | Park | G02B 7/08 359/824 |
| 2018/0039161 A1* | 2/2018 | Moto | G03B 13/36 |
| 2019/0121055 A1* | 4/2019 | Lee | G02B 7/08 |

\* cited by examiner

OPTICAL DRIVING MECHANISM

CROSS REFERENCE TO RELATED APPLICATIONS

This application claims the benefit of U.S. Provisional Application No. 62/670,580, filed on May 11, 2018, and China Patent Application No. 201910371090.8, filed on May 6, 2019, the entirety of which are incorporated by reference herein.

BACKGROUND OF THE INVENTION

Field of the Invention

The application relates in general to an optical driving mechanism, and in particular to an optical driving mechanism having a driving assembly and a position sensing assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the electronic device when using it.

To improve image quality, it is increasingly important to design a lens module with good auto-focusing function and optical image stabilization. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF INVENTION

To address the deficiencies of conventional products, an embodiment of the invention provides an optical driving mechanism, for driving an optical element, including: a fixed portion, a movable portion, a driving assembly and a position sensing assembly. The movable portion is movably connected to the fixed portion and includes a holder to sustain the optical element. The driving assembly is configured to drive the movable portion to move relative to the fixed portion. The position sensing assembly is configured to sense the distance of the movable portion relative to the fixed portion. The position sensing assembly includes a sensing magnetic element and a sensor, wherein the sensing magnetic element is disposed on the movable portion and has a rectangular structure. The direction of the long axis of the rectangular structure extends in a direction that is perpendicular to the optical axis of the optical element, and the direction of the long axis is different from the optical axis direction.

In some embodiments, a magnetic pole direction of the sensing magnetic element is substantially parallel to the optical axis. In some embodiments, the optical driving mechanism further comprises a first elastic member elastically connecting the movable portion, and the sensing magnetic member at least overlaps a portion of the first elastic elements when viewed along the optical axis direction. The optical driving mechanism further comprises a second elastic member elastically connecting the movable portion, and the sensing magnetic member at least overlaps a portion of the second elastic element when viewed along the optical axis direction. The sensing magnetic element has a width in a direction that is perpendicular to the optical axis, and that width is greater than a height of the sensing magnetic element, which is measured in a direction that is parallel to the optical axis.

In some embodiments, the holder has a recess recessed toward the optical axis, and the sensing magnetic element is disposed in the recess. The holder has a first retaining wall and a second retaining wall, and the recess is located between the first retaining wall and the second retaining wall. The second retaining wall has a notch that communicates with the recess. A portion of the driving assembly and a portion of the sensing magnetic element are exposed to the second retaining wall when viewed along the optical axis direction. The driving assembly includes a coil between the first retaining wall and the second retaining wall. In some embodiments, the driving assembly includes a coil that surrounds the holder. The sensing magnetic element has an outward side surface and an inward side surface. The outward side surface is connected to, and in contact with, the coil. The inward side surface faces the sidewall of the recess of the holder. There is a gap between the inward side surface and the sidewall of the recess.

In some embodiments, the holder has a stepped structure located in the recess, a sensing magnetic element disposed in the recess, and a stepped structure disposed between the sensing magnetic element and a sidewall of the recess. The sensing magnetic element is separated from the sidewall of the recess by a gap, for providing an adhesive on the stepped structure. In some embodiments, the recess has an extending groove portion. The sensing magnetic element is disposed in the recess. A space is formed between the sensing magnetic element and a sidewall of the recess by the groove portion. An adhesive is configured to disposed in the groove portion.

In some embodiments, the fixed portion includes a housing, a base, and a frame. The housing is disposed on the base to form a receiving space. The frame and the movable portion are disposed in the receiving space. The movable portion further includes a first elastic element, elastically connecting the holder to the housing and connecting the frame to the housing. The elastic element is located between the housing and the frame.

In some embodiments, the housing has at least one recessed portion that is recessed toward the first elastic element, and the first elastic element is in direct contact with the recessed portion and the frame. The frame has a protruding portion that protrudes toward the housing and extends through the first elastic element. The upper surface of the housing has a substantially quadrangular structure, and the housing has a plurality of recessed portions, wherein the recessed portions are respectively located on two adjacent corners of the quadrangular structure, and in a direction that is perpendicular to the optical axis, the protruding portion of the frame is located between the recessed portions.

In some embodiments, the first elastic element overlaps the frame in a direction that is perpendicular to the optical axis. The first elastic element has a substantially quadrangular structure, and the first elastic element has at least one notch portion at a corner of the quadrangular structure. The notch portion is an arc-shaped notch portion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
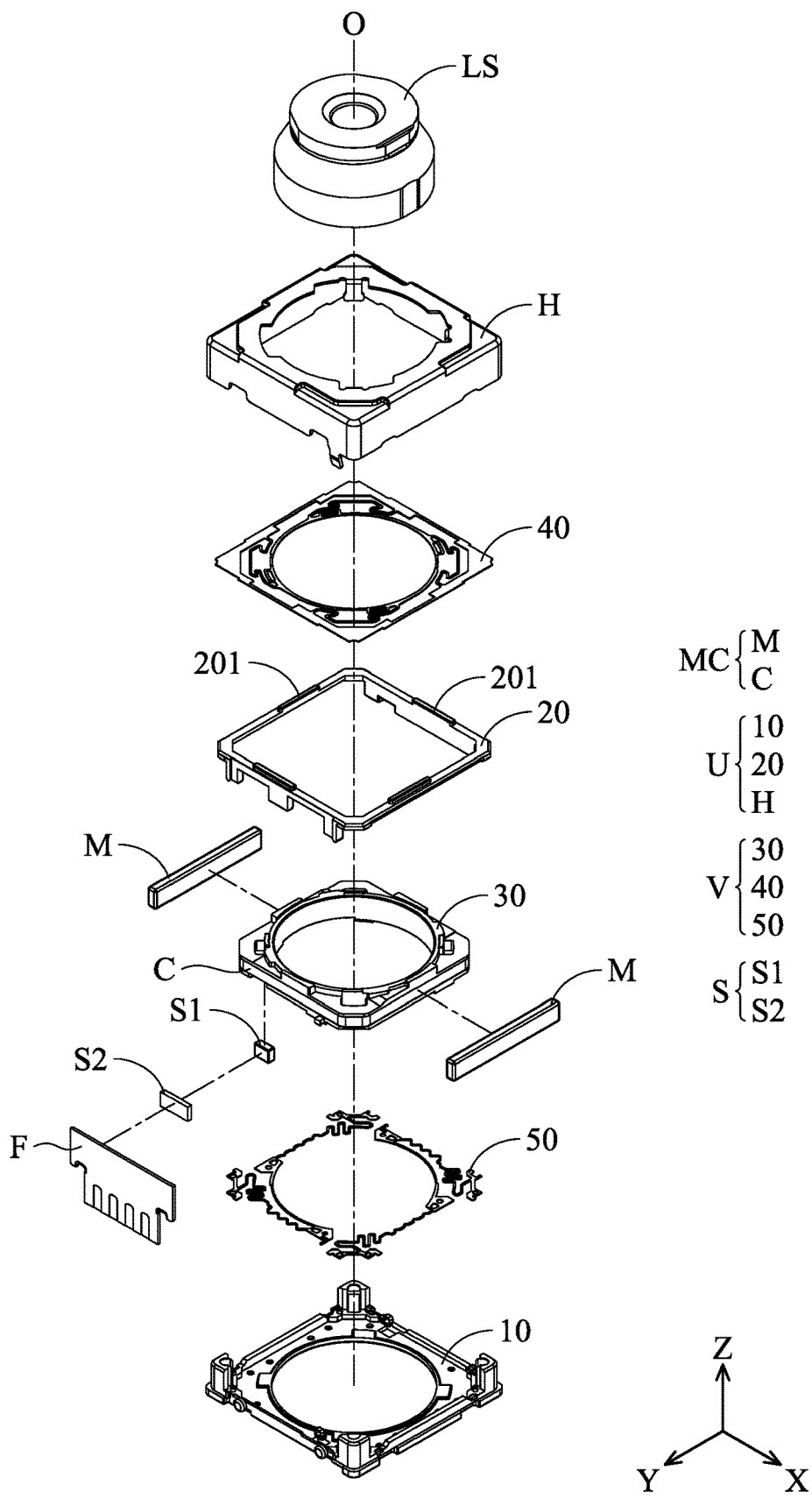
FIG. 1 is an exploded view diagram of an optical driving mechanism and an optical element according to an embodiment of the present invention.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that a component for specific description or specific figures can be present in any form with which a skilled person is familiar. In addition, when a layer is "above" other layers or a substrate, it might be "directly" on the layers or the substrate, or some other layers may be between the layer and the other layers. In this specification, relative expressions are used.

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure. Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 2:
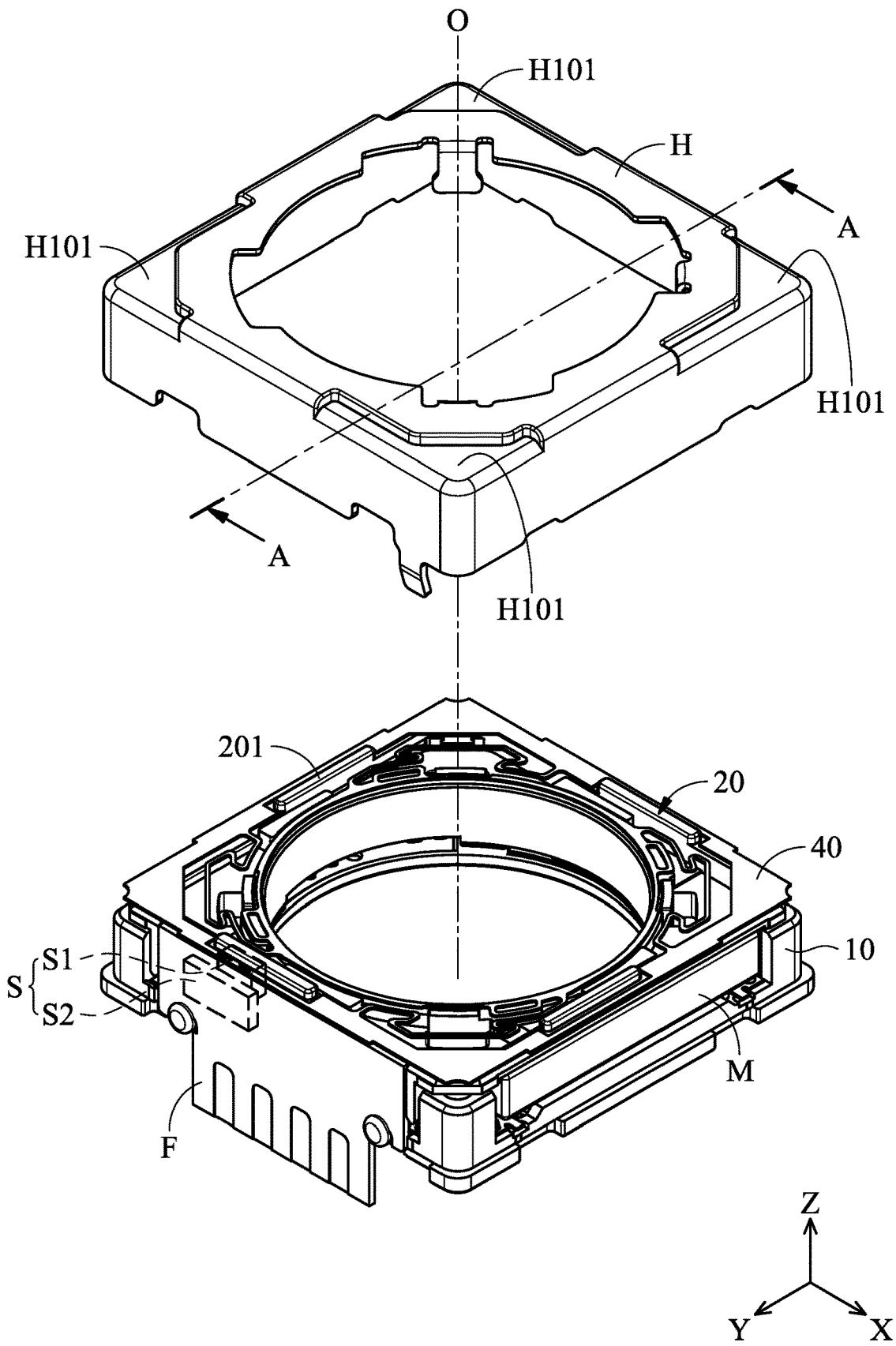
FIG. 2 is a schematic diagram showing the assembled optical driving mechanism in FIG. 1 (the housing H is still separated to clearly see the internal structure of the mechanism).

Referring to FIGS. 1 and 2, FIG. 1 is an exploded view showing an optical driving mechanism 1 according to an embodiment of the present invention, and FIG. 2 is a schematic view showing the assembled optical driving mechanism 1, wherein the housing—H is separated. The optical driving mechanism 1 can be used, for example, to drive and sustain an optical element LS, such as a lens or a lens assembly, and can be disposed inside an electronic device (such as a camera, a tablet or a mobile phone). When light (incident light) from the outside enters the optical driving mechanism 1, the light passes through the optical element LS in the optical driving mechanism 1 from a light incident end (close to the housing H) along the optical axis O to a light exit end (close to base 10), and then to an image sensor assembly (not shown) outside the optical driving mechanism 1, to acquire an image.

The optical driving mechanism 1 has a driving assembly which can drive the optical element LS to move, to achieve the purpose of optical zoom, Auto-Focusing (AF), and/or Optical Image Stabilization (OIS). The detailed structure of the optical driving mechanism 1 will be described below.

As shown in FIGS. 1 and 2, the optical driving mechanism 1 primarily comprises a fixed part U, a movable part V, a driving assembly MC and a position sensing element S. The fixed portion U includes a base 10, a frame 20, a circuit board F and a housing H. The movable portion V includes a holder 30, a first elastic element 40 and a second elastic element 50. The housing H and the base 10 of the fixed portion V are fixedly coupled/connected to each other to form a receiving space, thereby providing the foregoing components to be placed, and they can be protected.

The base 10 has a metal material (or a metal base made of metal) and includes four protruding pillars to provide good positioning when the housing H is connected thereto, the connecting area between the housing H and the base 10 is increased, so that stability can be improved. The frame 20 is located on the base 10 and is attached and affixed to the inner wall of the housing H. The holder 30 is located in the frame 20 and is configured to sustain the optical element LS (for example, including a lens or a lens group), and is elastically connected to the frame 20 and the base 10 of the fixed portion U via the first elastic element 40 and the second elastic element 50, thereby the base 10 being movable relative to the fixed portion U, for optical zoom, auto focus or optical anti-shake function.

The driving component MC, may be an electromagnetic driving assembly, includes a coil C and a plurality of magnetic elements (for example, magnets) M which are matched with each other. In detail, the coil C is disposed around or surrounding the holder 30, and the magnetic elements M are connected to the lower surface of the frame 20 and on two sides of the holder 30 to correspond to the aforementioned coil C. When a suitable driving signal (for example, a driving current) is applied to the coil C, a magnetic force is generated between the coil C and the magnetic element M, so that the driving assembly MC can drive the holder 30 (and the optical element LS disposed therein) of the movable portion V by the magnetic force to linearly move or do tilted movement, for example, moved along the optical axis O direction (Z-axis) of the optical element LS or tilted relative to the fixed portion U to achieve the effect of optical zoom, focus or shake compensation. It should be understood that the driving assembly MC in this embodiment is a moving coil type, and in other embodiments, it may be a moving magnetic type.

The first and second elastic elements 40 and 50 may be upper and lower leaf springs, respectively, for providing the holder 30 to movably connect the frame 20 and the base 10. The second elastic element 50 is disposed on the main body of the base 10 and connected to the lower portion of the holder 30. The first elastic element 40 is disposed above the frame 20 and the holder 30 to connect the top surface of the frame 20 with the upper portion of the holder 30.

Figure 3:
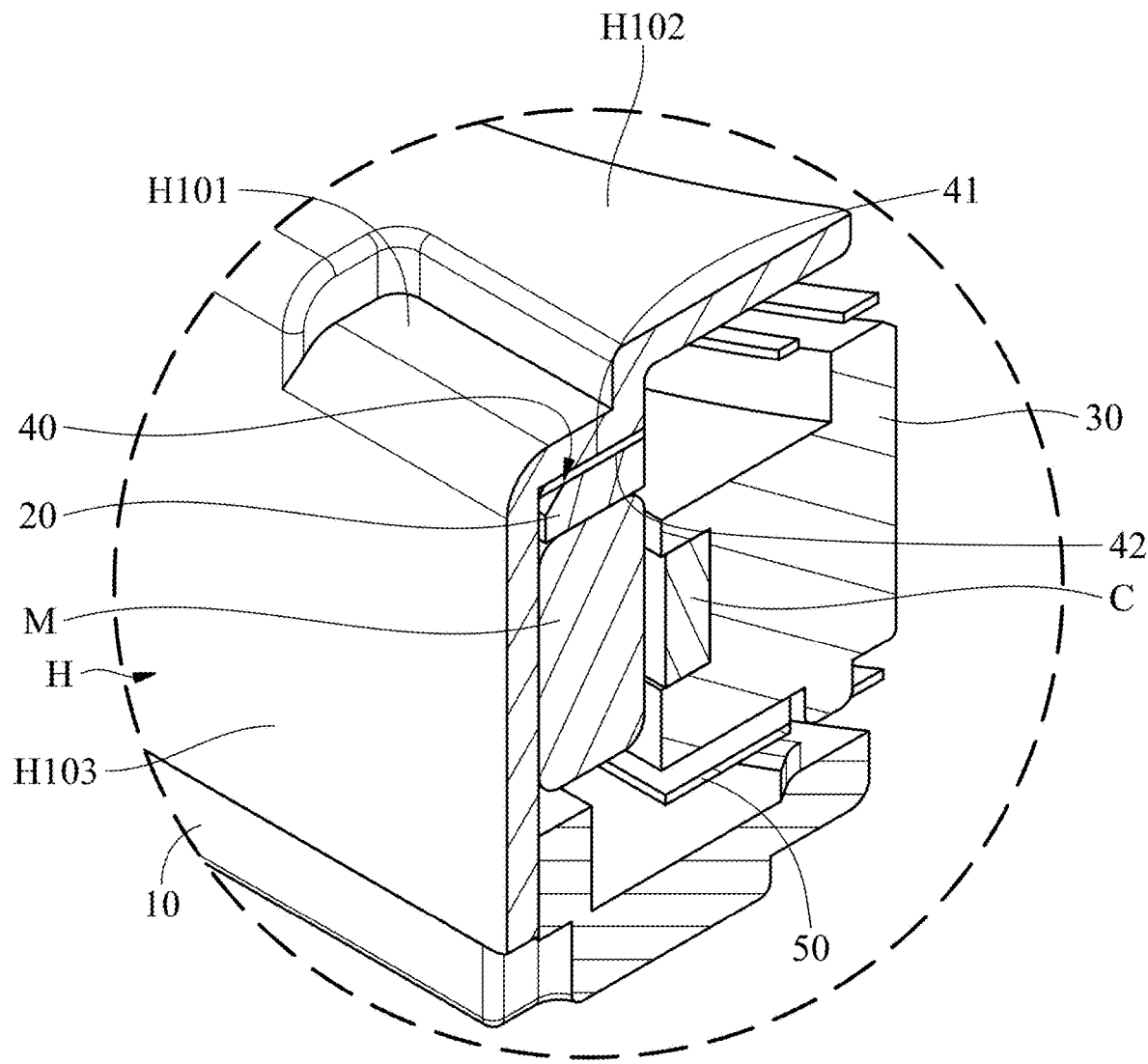
FIG. 3 is a cross-sectional view taken along the line A'-A' in FIG. 2 (after the housing assembled to the base).
Figure 3:
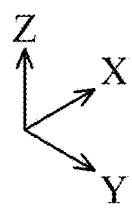

It should be noted that, regarding the first elastic element 40, as shown in FIG. 3, it is disposed between the housing H and the frame 20, and in the direction of the Z-axis (or the optical axis O), the first elastic element 40 is closer to the light incident end than the frame 20. Compared with the arrangement in which the conventional leaf spring system which is disposed under the frame 20 (the frame 20 is farther from the light incident end) so that the leaf spring is to be assembled through the frame 20 in the housing H, the first elastic element 40 in this embodiment is directly connected to the housing H. The frame 20 is connected to reduce the cumulative assembly tolerance of these parts, simplify the assembly complexity, and greatly improve the assembly precision. In addition, the housing H has a plurality of recessed portions H101 which are respectively located at four corners of the main body H of the housing H. The recessed portions H101 are recessed toward the light exiting direction, that is, they depress downward. When the housing H is combined with the first elastic element 40, the first elastic element 40 directly contacts the housing H and also bear against the inner side surface of the recessed portions H101. The housing H includes a top wall H102 and a sidewall H103. The top wall H102 is perpendicular to the sidewall H103, and the sidewall H103 is parallel to the optical axis O (FIG. 1). The recessed portions H101 are formed on the top wall H102 of the housing H. The first elastic element 40 includes a top surface 41 and a bottom surface 42. The top surface 41 and the bottom surface 42 are parallel to the top wall H102 of the housing H. The top surface 41 of the first elastic element 40 is in direct contact with the recessed portion H101. The bottom surface 42 of the first elastic element 40 is in direct contact with the frame 20.

Figure 4:
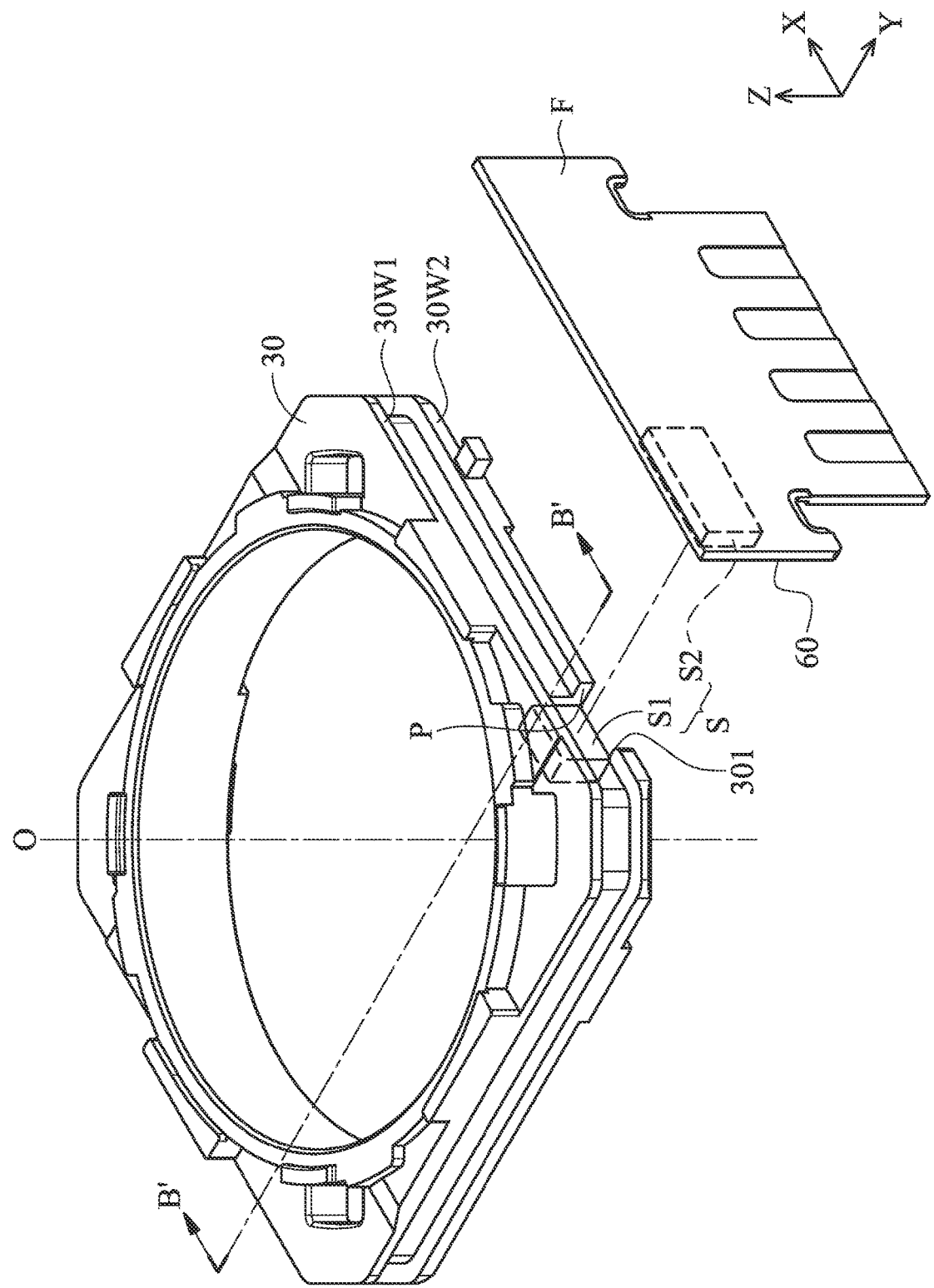
FIG. 4 is a schematic diagram of the holder, the position sensing assembly and the circuit board.

Regarding the position sensing assembly S, please referring to FIG. 4. The position sensing assembly S includes a sensing magnetic element S1 and a sensor S2 which are matched with each other. The circuit board F has a circuit board surface 60, the circuit board surface 60 is parallel to the optical axis O direction. The sensing magnetic element S1 and the sensor S2 are respectively disposed on the holder 30 of the movable portion V and on the circuit board surface 60 of the circuit board F of the fixed portion U. The sensing magnetic element S1 at least partially overlaps the sensor S2 when viewed along a normal vector (Y-axis) of the circuit board surface 60. Specifically, the sensing magnetic element S1 can be a permanent magnet, and the sensor S2 can be a Hall Effect Sensor. The Hall Effect Sensor can determine the position of the permanent magnet by detecting the change in the magnetic field of the permanent magnet, thereby increasing the accuracy of compensation or focusing. In another embodiment, other types of positioning component/element, such as a magnetoresistive sensor (MRS) or an optical sensor, may be used to detect the relative positions between the movable portion V and the fixed portion U. The circuit board F is disposed on one side of the base 10 and fixed to each other, for example, by applying adhesive, and the circuit board F can be electrically connected to the electronic components outside the optical driving mechanism 1.

The sensing magnetic element S1 of the position sensing assembly S is disposed in a recess 301 on the bottom side of the holder 30. In the Y-axis, the sensing magnetic element S1 does not protrude from the sidewall of the holder 30. By providing the magnetic element S1 in the recess 301, the space can be used more effectively to achieve miniaturization.

Figure 5:
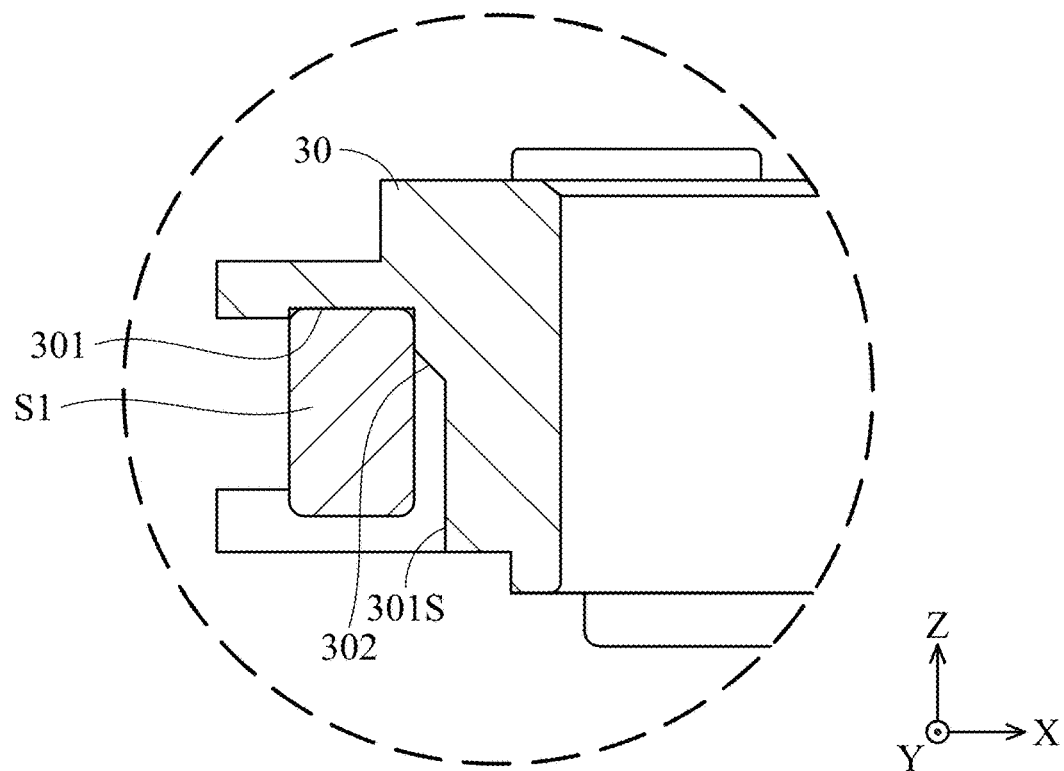
FIG. 5 is a cross-sectional view taken along the line B'-B' in FIG. 4.

As shown in FIG. 5, the holder 30 has a stepped structure 302 located in the recess 301. When the sensing magnetic element S1 is disposed in the recess 301, due to the step structure 302 provided, the sensing magnetic element S1 forms a gap d1 with the sidewall 301S of the recess 301, so that the adhesive G can be is provided in the gap d1 to allow the magnetic sensitive element S1 to be more firmly fixed to the holder 30.

Figure 6:
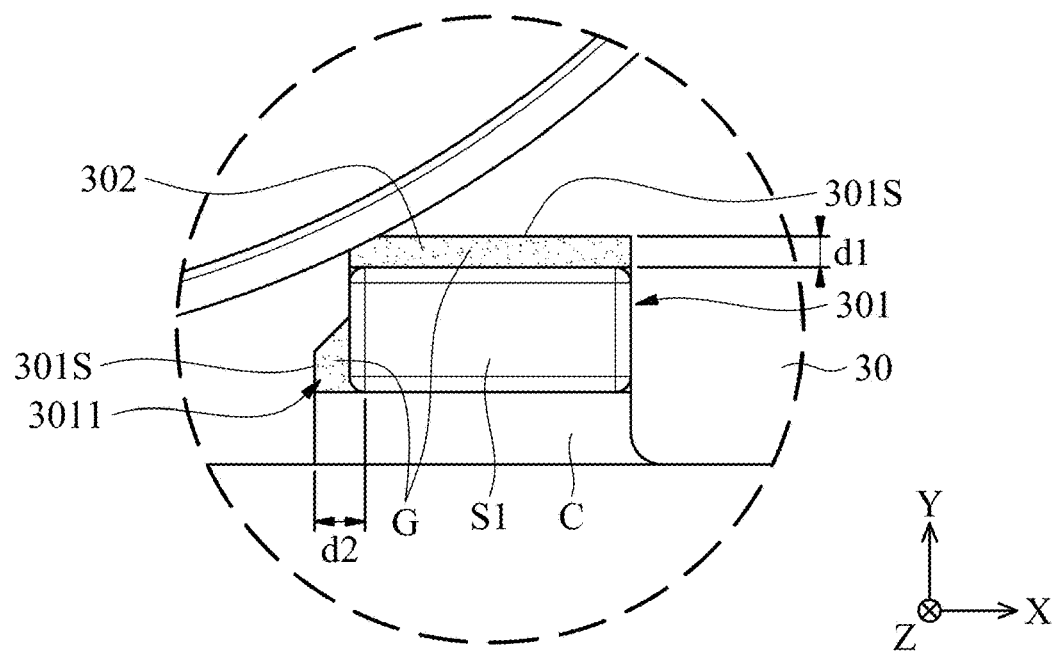
FIG. 6 is a partial bottom view diagram of the holder and the sensing magnetic element.

In addition, the recess 301 has an extending groove portion 3011. As shown in FIG. 6, when the sensing magnetic element S1 is disposed in the recess 301, the groove portion 3011 has a space d2 between the magnetic element S1 and the sidewall 301S of the recess 301. The gap d1 and the space d2 are positioned at different sides of the sensing magnetic element S1 that are perpendicular. Therefore, the adhesive G can be disposed in the groove portion 3011, and the connecting strength of the sensing magnetic element S1 to the holder 30 can be further enhanced. The glue G can be, for example, a solidified glue containing a resin material. The groove portion 3011 is surrounded by the coil C, the sensing magnetic element S1, and the sidewall 301S of the recess 301.

Figure 7:
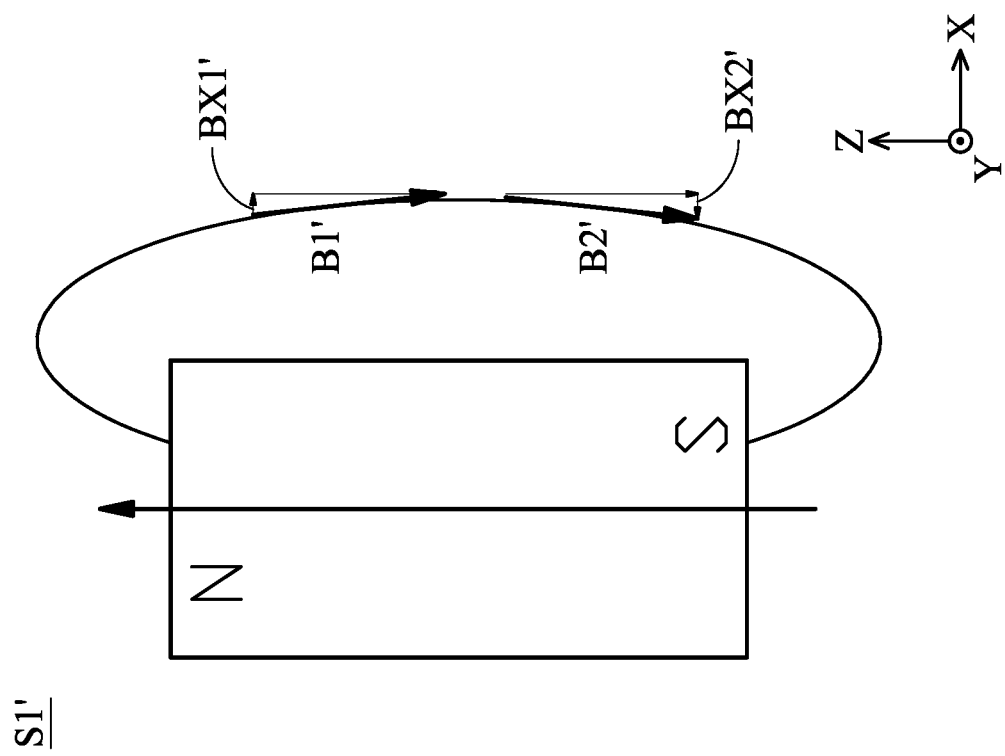
FIG. 7 is a schematic diagram of the sensing magnetic element S1 according to an embodiment of the present invention and a conventional magnet S1'.
Figure 7:
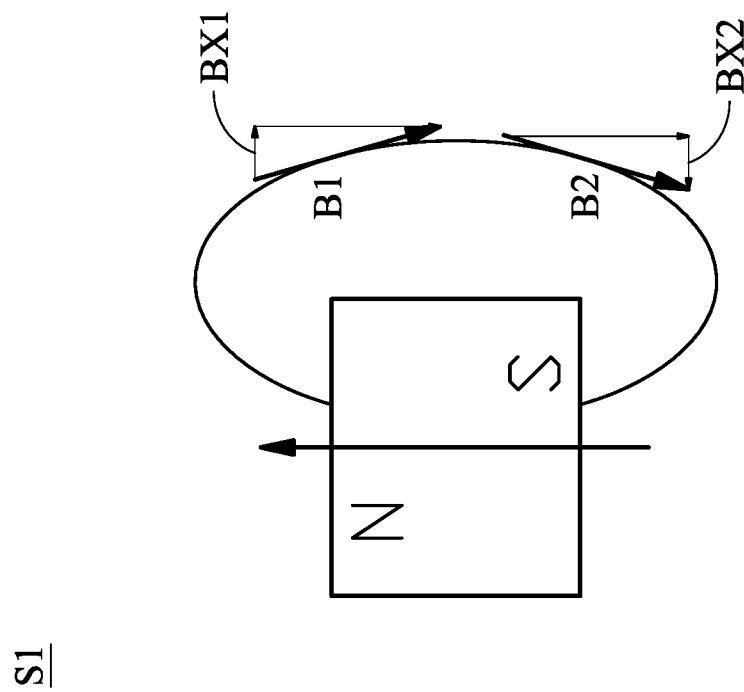

It should be noted that, as shown in FIG. 7, the sensing magnetic element S1 has an elongated structure which longitudinal (long axis) direction is perpendicular to the optical axis O, and the magnetic pole (N-S) direction is perpendicular to the long axis, that is, the magnetic pole direction is parallel to the optical axis O. In such a configuration, since the magnetic pole direction is still parallel to the optical axis O, unlike the method of simply transposing the sensing magnetic element S1 horizontally: the magnetic pole direction is perpendicular to the optical axis O, the sensor S2, which may cause the problem that the amount of change in the magnetic field is too small to be detected.

In fact, in the configuration in which the magnetic pole direction is parallel to the optical axis O, the lower the height (Z-axis) of the sensing magnetic element S1, the more sensitive the sensing result can be obtained, because the sensing direction of the sensor S2 is facing the sensing magnetic element S1, if the height of the sensing magnetic element S1 is too high, the amount of change in the horizontal direction magnetic field component is not large. As shown in FIG. 7, the sensing magnetic element S1 of the embodiment of the present invention and the conventional long type magnet S1', the magnetic field magnetic forces B1 and B2 of the sensing magnetic element S1 of the present embodiment have larger angle of inclination, and the sensed horizontal components BX1 and BX2 (on the X-axis) are large, the sensed magnetic field strengths are also large. The horizontal components BX1' and BX2' of the magnetic field magnetic forces B1' and B2' which are sensed by the conventional magnet S1' are smaller. In this way, since the height of the sensing magnetic element S1 in the optical axis O (Z-axis) direction is smaller, the overall height (Z-axis) of the optical driving mechanism 1 can be lowered under the condition that the amount of change in the magnetic field keeps to able to be sensed. In the present embodiment, the length (X-axis): high (Z-axis): width (Y-axis) of the sensing magnetic element S1 is 9:7:4. In other embodiments, the sensing magnetic element S1 may have other suitable proportional relationships if the length is greater than the height (width is less than the two), such as length: height is 3:2 or 7:4.

Figure 8:
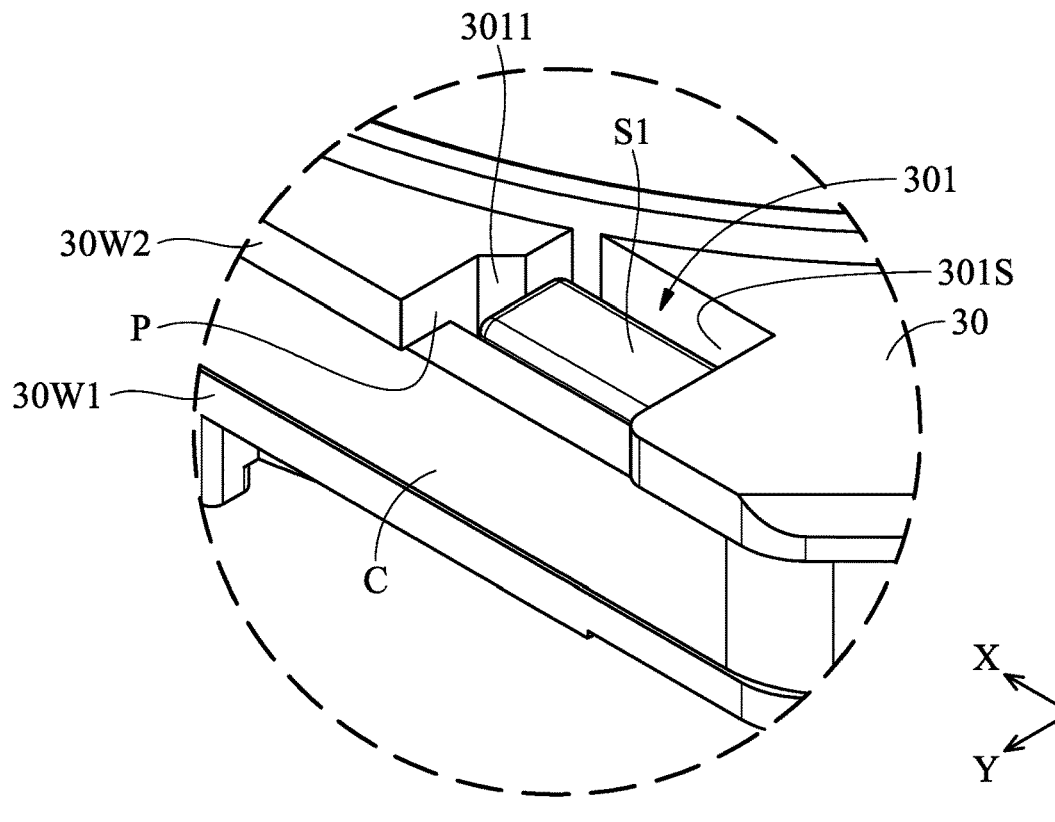
FIG. 8 is a schematic diagram showing the coil surrounding the holder and the sensing magnetic element disposed on the holder.

As shown in FIG. 8, the holder 30 has two retaining walls extending in the XY plane: a first retaining wall 30W1 and a second retaining wall 30W2, respectively located on the upper and lower sides of the holder 30. The retaining walls 30W1 and 30W2 can be used to clamp the coil C. The recess 301 and the sensing magnetic element S1 disposed therein are located between the first and second retaining walls 30W1 and 30W2, and the second retaining wall 30W2 has a notch P communicating with the groove 301. In the optical axis O direction, the recess 301 and the sensing magnetic element S1 disposed therein are exposed on the bottom surface of the second retaining wall 30W2.

Figure 9:
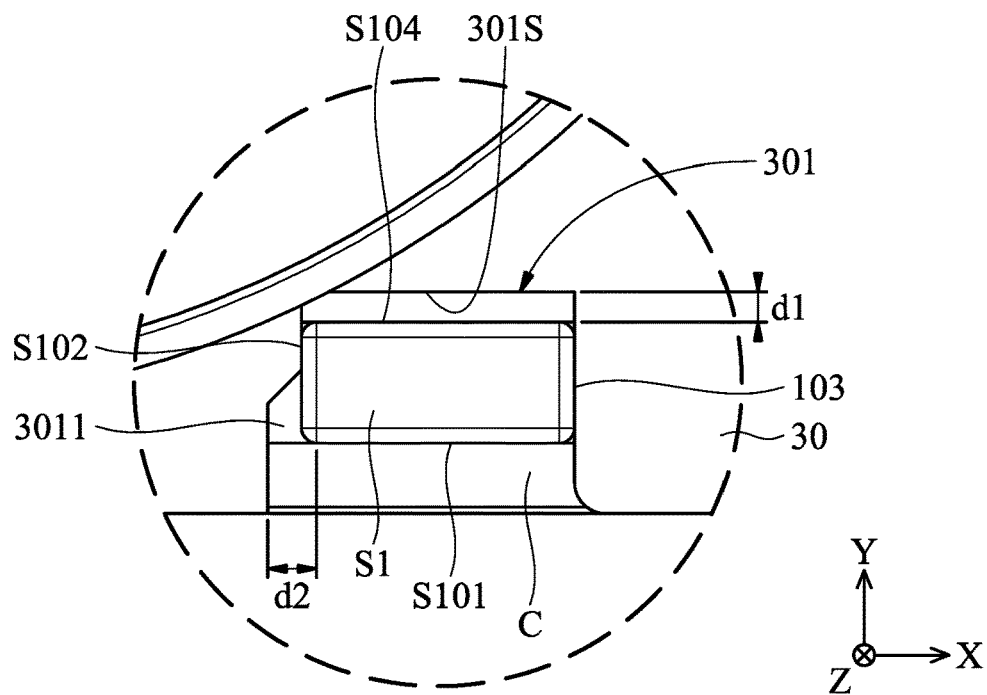
FIG. 9 is a bottom plan view diagram of FIG. 8.

FIG. 9 is a bottom side view showing the arrangement of the holder 30 and the sensing magnetic element S1 and the coil C. As shown, the coil C is surrounding the holder 30, and the sensing magnetic element S1 is inside the hollow structure of the coil C. The sensing magnetic element S1 is located between the coil C and the holder 30, and is closer to the optical axis O than the coil C. It should be noted that an outward side surface S101 of the sensing magnetic element S1 faces the coil C and is in direct contact therewith, and the other three sides: the side surfaces S102 and S103 and the inward side surface S104 face the holder 30, wherein there is a gap d1 between the inward side surface S104 and the sidewall 301S of the recess 301.

Figure 10:
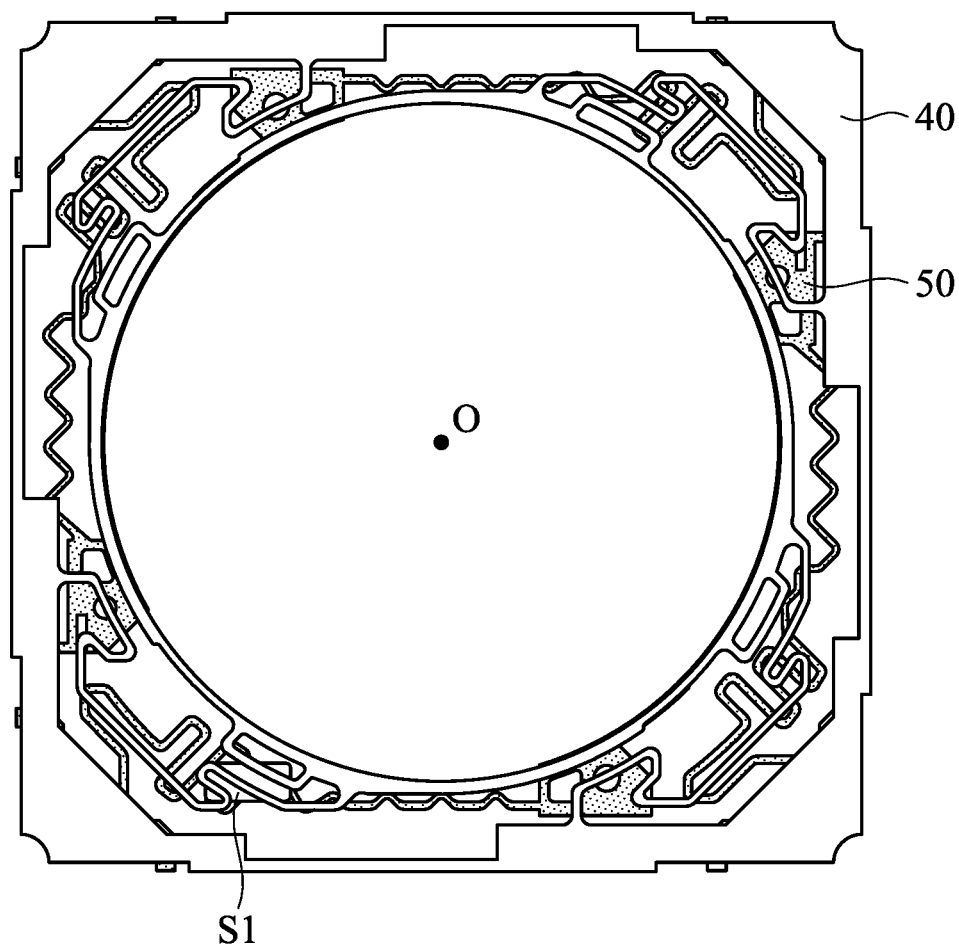
FIG. 10 is a top plan view diagram showing the first elastic element, the second elastic element and the sensing magnetic element.
Figure 10:
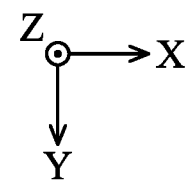

FIG. 10 shows a top view of the sensing magnetic element S1, the first elastic element 40, and the second elastic element 50. As can be seen from FIGS. 1 to 4, the first and second elastic elements 40 and 50 are respectively disposed on the upper and lower sides of the holder 30, and the sensing magnetic element S1 is disposed in the recess 301 of the holder 30. The first elastic element 40 and the second elastic element 50 are partially overlapped when viewed in the direction of the optical axis O, the usable space inside the housing H of the optical driving mechanism 1 can be increased, and the area of stress dispersion can also be increased, to improve the mechanical strength. In addition, since the sensing magnetic element S1 is disposed in the recess 301 of the holder 30 depressed toward the optical axis O, so that the sensing magnetic element S1 is at least overlapping with a portion of the first elastic element 40 and a portion of the second elastic element 50 in the optical axis direction. Therefore the space can be effectively used to reduce the space occupied by the sensing magnetic element S1 in the optical driving mechanism 1.

Figure 11:
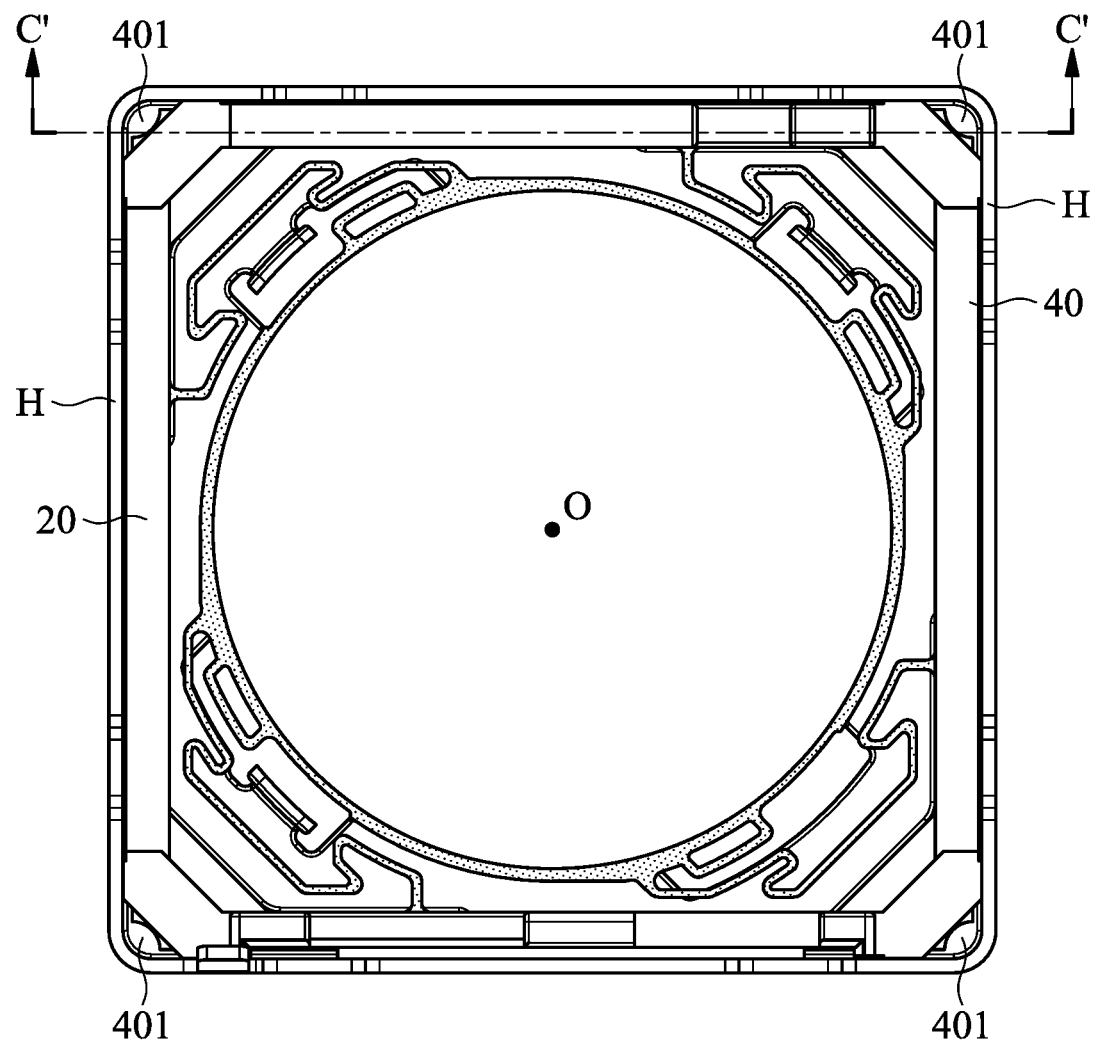
FIG. 11 is a bottom plan view diagram of the housing, the frame and the first elastic element after assembled.

FIG. 11 is a schematic view showing the assembly of the housing H with the first elastic element 40 and the frame 20. The first elastic element 40 has a substantially quadrangular structure having four arc-shaped notch portions 401 at each of its four corners, respectively. Since the housing H is used to improve the mechanical strength during metal working and sheet metal processing, rounded corners may be provided at the corners thereof. By the aforementioned notch portions 401, the first elastic element 40 in contact with the rounded corners of the housing H can be avoided, and the first elastic element 40 having a destructive squeezing or collision with the housing H during the movement also can be avoided, which can improve assembly accuracy and reduce the risk of damage.

Figure 12:
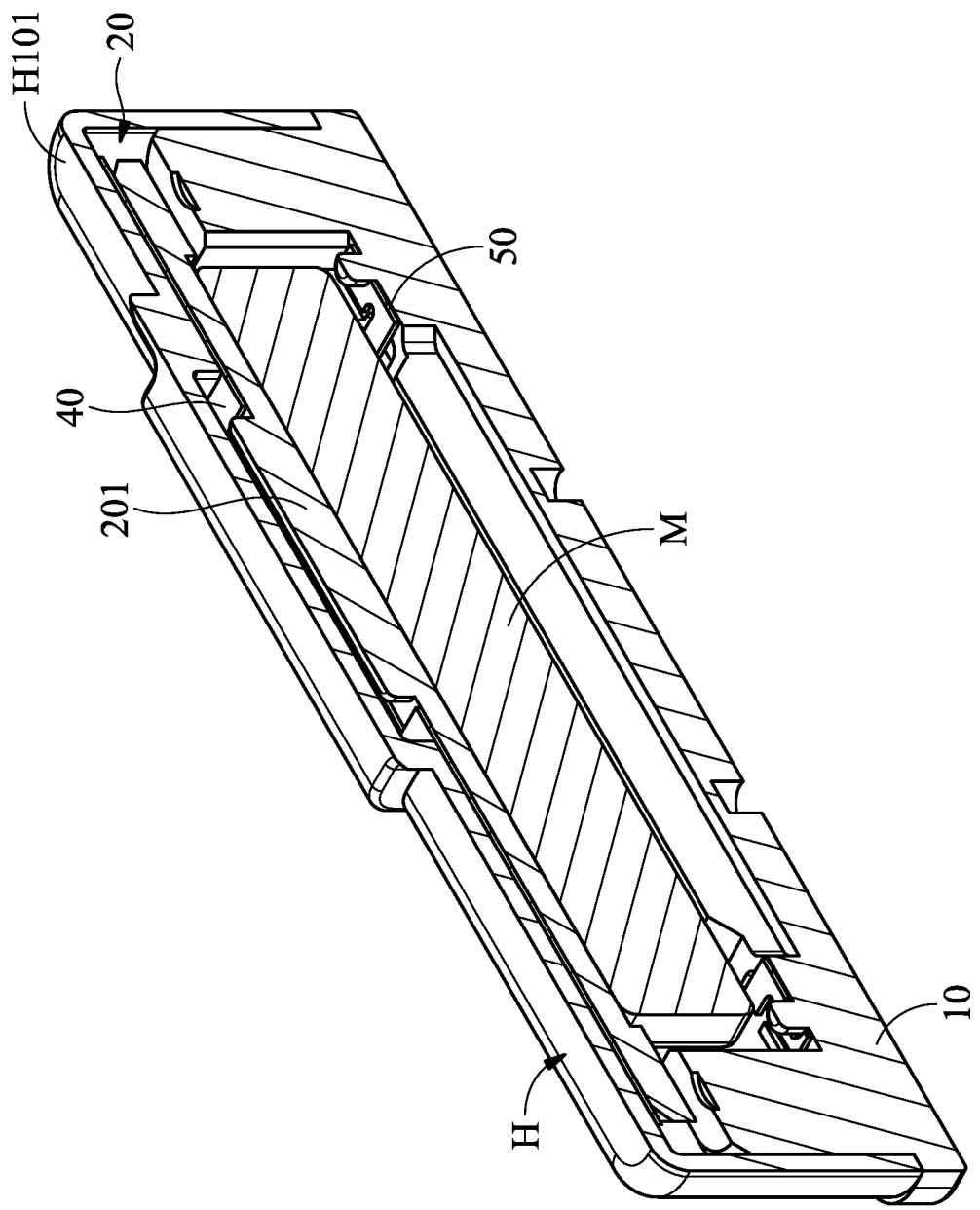
FIG. 12 is a cross-sectional view taken along the line C'-C' in FIG. 11.

Referring to FIGS. 1 and 12, the frame 20 has a plurality of protruding portions 201 positioned on the upper side of the frame 20, extending toward the housing H (or toward the light incident end), and protruding/extending through the first elastic element 40, to strengthen the structural strength and improve the positioning accuracy of the two. The first elastic element 40 is overlapping with the frame 20 in a direction perpendicular to the optical axis O. An upper surface of the housing H has a substantially quadrangular structure, and the plurality of recessed portions H101 of the housing H are respectively located at corners of the quadrangular structure, and the protruding portion 201 of the frame 20 is located between two adjacent recessed portions H101 in a direction that is perpendicular to the optical axis O. Therefore, the positioning accuracy of the frame 20, the first elastic element 40 and the housing H can be improved.

In summary, an embodiment of the present invention provides an optical driving mechanism, for driving an optical element, including: a fixed portion, a movable portion, a driving assembly and a position sensing assembly. The movable portion is movably connected to the fixed portion and includes a holder for sustaining the optical element. The driving assembly is configured to drive the movable portion to move relative to the fixed portion. The position sensing assembly is configured to sense a distance of the movable portion relative to the fixed portion, the position sensing assembly includes a sensing magnetic element and a sensor, wherein the sensing magnetic element is disposed on the movable portion and has a rectangular structure. A direction of a long axis of the rectangular structure extends in a direction that is perpendicular to the optical axis of the optical element, and the direction of the long axis is different from the optical axis direction.

The embodiments in present invention have at least one of the advantages or effects that the sensing magnetic element has a rectangular structure (one side is larger than the other adjacent side), and its long axis direction is perpendicular to the optical axis of the optical element, and the magnetic pole direction thereof is also parallel to the optical axis. Therefore, under the condition that the magnetic field change amount is able to be sensed (or even more significant changes is detected), the overall height of the optical driving mechanism can be reduced due to the less height of the sensing magnetic element in the direction of the optical axis, thereby miniaturizing the product.

In addition, in some embodiments, the fixed portion includes a housing, a base and a frame, and the movable portion further includes a first elastic element. The housing is disposed on the base and forms a receiving space with the base, and the frame and the movable portion are disposed in the receiving space. The first elastic element elastically connects the holder to the housing and connects the frame to the housing, wherein the first elastic element is located between the housing and the frame in the optical axis. Compared with the conventional system that the spring piece is disposed under the frame so that the spring piece is to be transmitted through the frame to be assembled with the outer casing, the first elastic element in the embodiment is directly connected with the housing and the frame. It can reduce or decrease the cumulative tolerance of the mutual assembly of these parts, increase the ease of assembly, and also greatly improve the assembly accuracy of the mechanism.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism configured to drive an optical element, comprising:
    a fixed portion, comprising a circuit board with a circuit board surface;
    a movable portion, movably connected to the fixed portion, and the movable portion includes a holder, wherein the holder is configured to sustain an optical element;
    a driving assembly, configured to drive the movable portion to move relative to the fixed portion, comprising a coil surrounding the holder; and
    a position sensing assembly, configured to sense a moving distance of the movable portion relative to the fixed portion, and the position sensing assembly includes a sensing magnetic element and a sensor, wherein the sensing magnetic element is disposed on the movable portion and has a rectangular structure, the sensor is disposed on the circuit board surface,
    wherein a long axis direction of the rectangular structure extends in a direction that is perpendicular to an optical axis direction of the optical element, and the long axis direction is different from the optical axis direction,
    wherein the circuit board surface is parallel to the optical axis direction, and the sensing magnetic element at least partially overlaps the sensor when viewed along a normal vector of the circuit board surface, and
    wherein the holder has a recess recessed toward the optical axis, the recess has a groove portion and a sidewall, the sensing magnetic element is disposed in the recess, the sensing magnetic element forms a gap with the sidewall of the recess, the groove portion has a space between the sensing magnetic element and the sidewall of the recess, and the groove portion is configured to contain an adhesive, wherein the gap and the space are positioned at different sides of the sensing magnetic element that are perpendicular, the groove portion is surrounded by the coil, the sensing magnetic element, and the sidewall of the recess.

2. The optical driving mechanism as claimed in claim 1, wherein a magnetic pole direction of the sensing magnetic element is substantially parallel to the optical axis.

3. The optical driving mechanism as claimed in claim 1, further comprising a first elastic element elastically connecting the movable portion, and the sensing magnetic member at least overlaps a portion of first elastic element when viewed along the optical axis direction.

4. The optical driving mechanism as claimed in claim 3, further comprising a second elastic element elastically connecting the movable portion, and the sensing magnetic member at least overlaps a portion of the second elastic element when viewed along the optical axis direction.

5. The optical driving mechanism as claimed in claim 1, wherein the sensing magnetic element has a width and a height, the width in a direction that is perpendicular to the optical axis that is greater than the height in a direction that is parallel to the optical axis.

6. The optical driving mechanism as claimed in claim 1, wherein the holder has a first retaining wall and a second retaining wall, and the recess is located between the first retaining wall and the second retaining wall.

7. The optical driving mechanism as claimed in claim 6, wherein the second retaining wall has a notch that communicates with the recess.

8. The optical driving mechanism as claimed in claim 6, wherein a portion of the driving assembly and a portion of the sensing magnetic element are exposed to the second retaining wall when viewed along the optical axis direction.

9. The optical driving mechanism as claimed in claim 8, wherein the coil is between the first retaining wall and the second retaining wall.

10. The optical driving mechanism as claimed in claim 1, wherein the sensing magnetic element has:
    an outward side surface, connecting and in contact with the coil; and
    an inward side surface, facing the sidewall of the recess of the holder, and the gap is between the inward side surface and the sidewall of the recess.

11. The optical driving mechanism as claimed in claim 1, wherein the holder has a stepped structure located in the recess, the sensing magnetic element disposed in the recess, and the stepped structure is disposed between the sensing magnetic element and the sidewall of the recess, wherein the sensing magnetic element is separated from the sidewall of the recess by the gap for providing the adhesive on the stepped structure.

12. The optical driving mechanism as claimed in claim 1, wherein the fixed portion comprises:
    a housing;
    a base, wherein the housing is disposed on the base to form a receiving space; and
    a frame, wherein the frame and the movable portion are disposed in the receiving space,
    wherein the movable portion further comprises a first elastic element, elastically connecting the holder to the housing, and the first elastic element is connected the frame and the housing, and
    wherein the first elastic element is located between the housing and the frame.

13. The optical driving mechanism as claimed in claim 12, wherein the housing has at least one recessed portion that is recessed toward the first elastic element, and the first elastic element is in direct contact with the recessed portion and the frame.

14. The optical driving mechanism as claimed in claim 12, wherein the frame has a protruding portion that protrudes toward the housing and extends through the first elastic element.

15. The optical driving mechanism as claimed in claim 14, wherein an upper surface of the housing has a substantially quadrangular structure, and the housing has a plurality of recessed portions, wherein the recessed portions are respectively located at two adjacent corners of the quadrangular structure, and in a direction that is perpendicular to the optical axis, the protruding portion of the frame is located between the recessed portions.

16. The optical driving mechanism as claimed in claim 12, wherein the first elastic element overlaps the frame in a direction that is perpendicular to the optical axis.

17. The optical driving mechanism as claimed in claim 12, wherein the first elastic element has a substantially quadrangular structure, and the first elastic element has at least one notch portion at a corner of the quadrangular structure.

18. The optical driving mechanism as claimed in claim 17, wherein the notch portion is an arc-shaped notch portion.

\* \* \* \* \*